United States Patent Office 2,794,038
Patented May 28, 1957

2,794,038

HALOGENATED MERCURISULFONATES

Sidney B. Richter, Chicago, Ill., assignor to Velsicol Chemical Corporation, a corporation of Illinois No Drawing. Application January 22, 1954,
Serial No. 405,657

2 Claims. (Cl. 260—433)

This invention relates to a new fungicidal composition of matter. Specifically, the present invention relates to 5-(p-ethylmercurisulfonylphenyl) - 1,2,3,4,7,7 - hexachlorobicyclo-(2.2.1)-2-heptene having the structure:

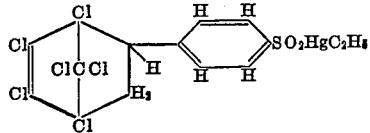

and to its use in the control of fungus infestations.

The composition of the present invention is useful in low concentrations of from 5 to 25 parts per million in controlling tomatoe anthracnose (*Colletotrichum phomoides*), watermelon end rot (*Diplodia natelensis*), barley stripe disease (*Helminthosporium gramineum*), citrus stem rot (*Phomopsis citri*), tomatoe early blight (*Alternaria solani*), and crown and root rot of alfalfa and soybeans (*Rhizoctonia solani*).

The product of the present invention may be prepared from sulfonyl chlorides or sulfonyl fluorides of 5-phenyl-1,2,3,4,7,7-hexachlorobicyclo-(2.2.1)-2-heptene described in the copending application of Percy B. Polen, Serial No. 405,658, filed Jan. 22, 1954, now Patent No. 2,712,030. Such sulfonyl halides are treated with sodium acetate to prepare the sodium salt and the sodium salt reacted with ethyl mercuri acetate or any ethyl mercuri salt to form the ethyl mercuri sulfonate compound of the present invention. The following specific example will illustrate the preparation of the present product:

A mixture comprising 47.5 g. (0.1 mole) of 5-(p-chlorosulfonylphenyl) - 1,2,3,4,7,7 - hexachlorobicyclo-(2.2.1)-2-heptene, 100 ml. glacial acetic acid, and 16 g. (0.2 mole) of sodium acetate was heated at reflux for three hours. The inorganic salt was removed, the acetic acid filtrate concentrated to a small volume and the slurry formed triturated thoroughly with ethanol to yield 49 grams of sodium salt.

The sodium salt prepared as above (24 g.) was dissolved in 1800 ml. water. The solution was filtered and 50 ml. of 29% aqueous ethyl mercuri acetate was added to the filtrate. The crude product precipitated rapidly in high yield and was purified by crystallization from acetone. The pure product was a crystalline solid melting at 226-227° C. with decomposition.

The product of the present invention as prepared in the foregoing example is useful in the control of fungus. The following experimental data will illustrate the fungitoxic character of 5-(p-ethylmercurisulfonylphenyl)-1,2,3,4,7,7-hexachlorobicyclo-(2.2.1)-2-heptene when applied to common and harmful fungus cultures. The test utilized is a thread plate evaluation, and numbers indicate the colonies developing after six days of incubation. Letters after the numbers indicate the size of the colony as follows: L= large; M=medium; S=small; VS=very small. The concentration of fungicide in the following table was 20 parts per million.

| Culture | 5-(p-ethylmercuri-sulfonylphenyl)-1,2,3,4,7,7-hexa-chlorobicyclo-(2.2.1)-2-heptene |
|---|---|
| *Colletotrichum phomoides* | 4 M, 3 L |
| *Diplodia natelensis* | 0 |
| *Helminthosporium gramineum* | 0 |
| *Phomopsis citri* | 1 S, 1 M |
| *Xanthomonas phaseoli* | 0 |

The compound of the present invention may be prepared as a wettable powder, an emulsifiable concentrate, solvent solution, or dust.

I claim:

1. As a new composition of matter having the following structure:

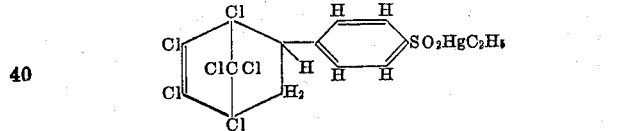

2. A method of controlling fungus growth which comprises applying the compound of claim 1 to fungus infestations in their natural habitat.

References Cited in the file of this patent
UNITED STATES PATENTS

| 2,618,645 | Bowles | Nov. 18, 1952 |
| 2,673,172 | Polen et al. | Mar. 23, 1954 |